United States Patent
Kim et al.

(10) Patent No.: US 11,907,278 B2
(45) Date of Patent: Feb. 20, 2024

(54) METHOD AND APPARATUS FOR DERIVING KEYWORDS BASED ON TECHNICAL DOCUMENT DATABASE

(71) Applicant: SAMSUNG ELECTRONICS CO., LTD., Suwon-si (KR)

(72) Inventors: Hyun Pil Kim, Seoul (KR); Tae Sung Kim, Suwon-si (KR); Chang-Ju Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/719,443

(22) Filed: Apr. 13, 2022

(65) Prior Publication Data

US 2023/0126421 A1    Apr. 27, 2023

(30) Foreign Application Priority Data

Oct. 21, 2021 (KR) .................. 10-2021-0141158

(51) Int. Cl.
| | | |
|---|---|---|
| *G06F 16/00* | (2019.01) | |
| *G06F 16/38* | (2019.01) | |
| *G06F 16/33* | (2019.01) | |
| *G06F 16/35* | (2019.01) | |

(52) U.S. Cl.
CPC ............ *G06F 16/38* (2019.01); *G06F 16/334* (2019.01); *G06F 16/353* (2019.01); *G06F 2216/03* (2013.01); *G06F 2216/11* (2013.01)

(58) Field of Classification Search
CPC ...... G06F 16/38; G06F 16/353; G06F 16/334; G06F 2216/11
See application file for complete search history.

(56) References Cited

U.S. PATENT DOCUMENTS

| | | | |
|---|---|---|---|
| 6,714,897 B2 | | 3/2004 | Whitney et al. |
| 10,268,731 B2 | * | 4/2019 | Lundberg ............ G06F 16/9535 |
| 10,817,568 B2 | | 10/2020 | Alzate Perez et al. |
| 2004/0006457 A1 | * | 1/2004 | Dehlinger ............... G06F 16/35 |
| | | | 707/E17.09 |

(Continued)

FOREIGN PATENT DOCUMENTS

| | | |
|---|---|---|
| JP | 2015130136 | 7/2015 |
| KR | 20140026796 | 3/2014 |

(Continued)

*Primary Examiner* — Alexander Khong
(74) *Attorney, Agent, or Firm* — Fish & Richardson P.C.

(57) ABSTRACT

A method includes searching a technical document including a first, second, and third data fields based on search terms and search year ranges related to a technical field, generating a keyword set using the first, second, and third data fields of the searched technical document, scoring a plurality of keywords included in the keyword set, and selecting some of the plurality of keywords, re-searching the technical document related to the technical field, using the selected keywords, scoring the re-searched technical document to derive a representative document representing the technical field, and deriving a representative keyword representing the technical field, using the second data field included in the representative document, wherein the first data field includes a title of the technical document, the second data field includes a summary of the technical document, and the third data field includes keywords of the technical document.

20 Claims, 15 Drawing Sheets

(56) References Cited

U.S. PATENT DOCUMENTS

| | | | |
|---|---|---|---|
| 2004/0049498 A1* | 3/2004 | Dehlinger | G06F 16/353 |
| 2005/0027723 A1* | 2/2005 | Jones | G06F 16/334 |
| 2005/0256889 A1* | 11/2005 | McConnell | G06F 16/353 |
| 2006/0117002 A1* | 6/2006 | Swen | G06F 16/353 |
| 2006/0122849 A1* | 6/2006 | Masuyama | G06F 16/353 |
| | | | 707/E17.09 |
| 2007/0179930 A1* | 8/2007 | Wang | G06F 16/334 |
| 2009/0228777 A1* | 9/2009 | Henry | G06F 16/40 |
| | | | 707/999.005 |
| 2010/0083377 A1* | 4/2010 | Rowney | G06F 16/334 |
| | | | 726/30 |
| 2018/0336283 A1* | 11/2018 | Mukherjee | G06F 16/954 |
| 2018/0349352 A1 | 12/2018 | Mabbu | |

FOREIGN PATENT DOCUMENTS

| | | |
|---|---|---|
| KR | 20140081721 | 7/2014 |
| KR | 101505546 | 3/2015 |
| KR | 20210086402 | 7/2021 |

\* cited by examiner

500

METHOD AND APPARATUS FOR DERIVING KEYWORDS BASED ON TECHNICAL DOCUMENT DATABASE

CROSS-REFERENCE TO RELATED APPLICATION

This U.S. non-provisional patent application claims priority under 35 U.S.C. § 119 to Korean Patent Application No. 10-2021-0141158, filed on Oct. 21, 2021 in the Korean Intellectual Property Office, the disclosure of which is incorporated by reference herein in its entirety.

BACKGROUND

1. Technical Field

The present disclosure relates to a method and apparatus for deriving keywords through a technical document database. Specifically, the present disclosure relates to a method and apparatus for generating a keyword set included in a technical document using data mining to derive representative keywords and representative documents.

2. Description of the Related Art

It is difficult to understand how new technology trends change and which technologies are required to further advance current technologies. As an example, technology trends analyzed and published by multiple consulting companies often use a method known as the Delphi technique involves comprehensively examining the opinions of experts and drawing conclusions, but the method tends to have a low accuracy of about 30%.

As materials for analyzing technology trends, news reported in the media, public announcement materials of companies, patents, theses, and the like may be used. Among them, it is difficult to define detailed technologies of the news reported in the media and the public announcement materials of companies, and abstract keywords of the highest level concept are often used as technical terms. Therefore, using abstract keywords of the highest level concepts in the news reported in the media and the public announcement materials of the companies may be inadequate to define the technical trends and derive the detailed technologies.

On the other hand, patents often describe new technologies as part of technology trends, and this may result in citation of the patents such that patents are useful for analyzing the technology trends.

Further, theses may be easily used for analyzing the technology trends, by referring to a number of citations and the like.

SUMMARY

Aspects of the present disclosure provide a method for deriving keywords capable of deriving representative keywords of a technical document and representative documents, using a data field included in the technical document.

Aspects of the present disclosure also provide an apparatus for deriving keywords capable of deriving representative keywords of a technical document and representative documents, using the data field included in the technical document Aspects of the present disclosure also provide a computer readable medium that stores a computer program capable of deriving representative keywords of a technical document and representative documents, using the data field included in the technical document.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a method for deriving keywords includes a step of searching, by a processor executing a computer program, a technical document including a first data field, a second data field and a third data field based on search terms and search year ranges related to a technical field, a step of generating a keyword set using the first data field, the second data field and the third data field of the searched technical document, scoring a plurality of keywords included in the keyword set, and selecting some of the plurality of keywords, a step of re-searching, by the processor executing the computer program, the technical document related to the technical field, using the selected keywords, a step of scoring the re-searched technical document to derive a representative document representing the technical field, and a step of deriving a representative keyword representing the technical field, using the second data field included in the representative document, wherein the first data field includes a title of the technical document, the second data field includes a summary of the technical document, and the third data field includes keywords of the technical document.

According to another aspect of the present disclosure, an apparatus for deriving keywords includes a processor, a tangible non-transitory computer readable medium that stores a computer program, and a memory which is configured to load instructions related to the computer program to be executed by the processor. When executed, the computer program causes the processor to search a technical document including a first data field, a second data field and a third data field based on search terms and search year ranges related to a technical field, generate a keyword set using the first data field, the second data field and the third data field of the searched technical document, score a plurality of keywords included in the keyword set, and select some of the plurality of keywords, re-search the technical document related to the technical field, using the selected keywords, score the re-searched technical document to derive a representative document representing the technical field, and derive a representative keyword representing the technical field, using the second data field included in the representative document. The first data field includes a title of the technical document, the second data field includes a summary of the technical document, and the third data field includes keywords of the technical document.

According to another aspect of the present disclosure, a tangible non-transitory computer readable medium stores a computer program. When executed by a processor, the computer program causes a computer apparatus to perform a process including a step of searching a technical document including a first data field, a second data field and a third data field based on search terms and search year ranges related to a technical field, a step of generating a keyword set using the first data field, the second data field and the third data field of the searched technical document, scoring a plurality of keywords included in the keyword set, and selecting some of the plurality of keywords, a step of re-searching the technical document related to the technical field, using the selected keywords, a step of scoring the re-searched technical document to derive representative documents representing the technical field, and a step of deriving a representative keyword representing the technical field, using the second data field included in the representative document. The first data field includes a title of the technical document, the second data field includes a summary of the technical document, and the third data field includes keywords of the technical document.

Other features and embodiments may be apparent from the following detailed description, the drawings and the claims.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE EMBODIMENTS

Hereinafter, embodiments according to the technical concept(s) of the present disclosure will be described referring to the accompanying drawings.

Figure 1:
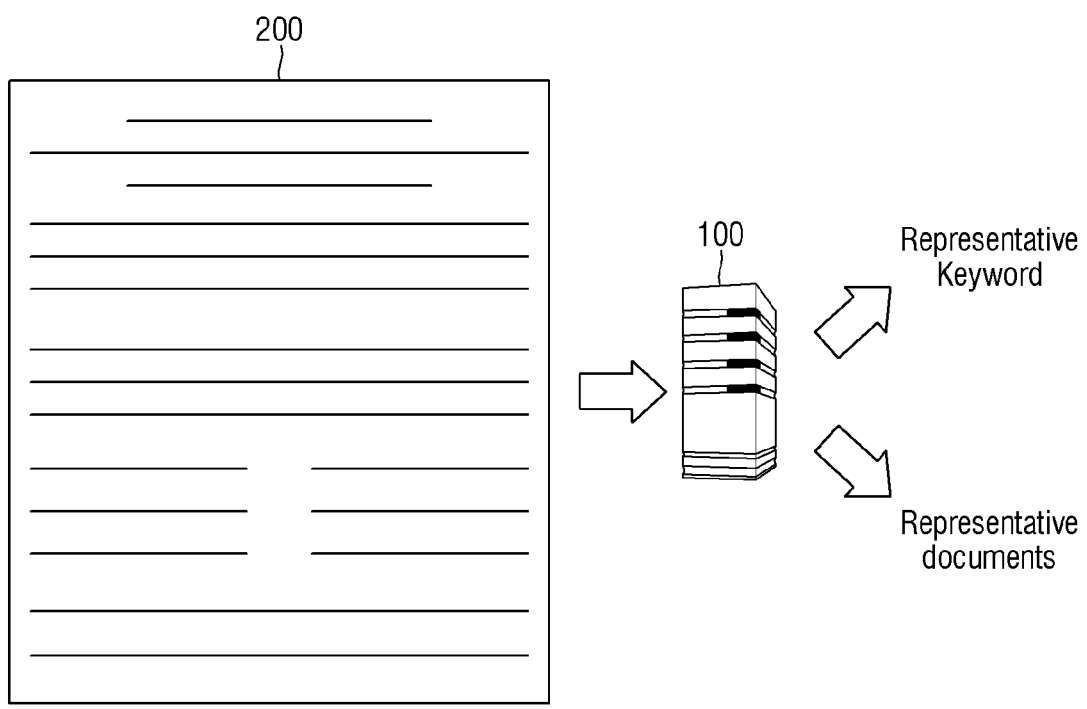
FIG. 1 is an exemplary diagram which shows an overview of a method for deriving keywords according to an embodiment of the present disclosure.

FIG. 1 is an exemplary diagram which shows an overview of a method for deriving keywords according to an embodiment of the present disclosure.

Referring to FIG. 1, a keyword derivation system may include a keyword deriving apparatus 100 and a technical document 200.

The keyword deriving apparatus 100 may be an apparatus capable of performing the method for deriving keywords to be described below in the present specification. Examples of a keyword deriving apparatus 100 include an electronic device such as a computer which includes a memory that stores instructions, and a processor that executes the instructions to implement methods and individual steps attributed herein to the keyword deriving apparatus 100.

The technical document 200 may be a document including academic information. For example, the technical document 200 may be a patent document or a thesis. However, the technical concept(s) of the present disclosure are not limited thereto, and the technical document 200 may be various other documents including academic information.

The keyword deriving apparatus 100 may derive representative keywords and representative documents of the technical field of the technical document 200, using the data field included in the technical document 200. One or more specific method(s) performed by or at least using the keyword deriving apparatus 100 will be described below.

Figure 2:
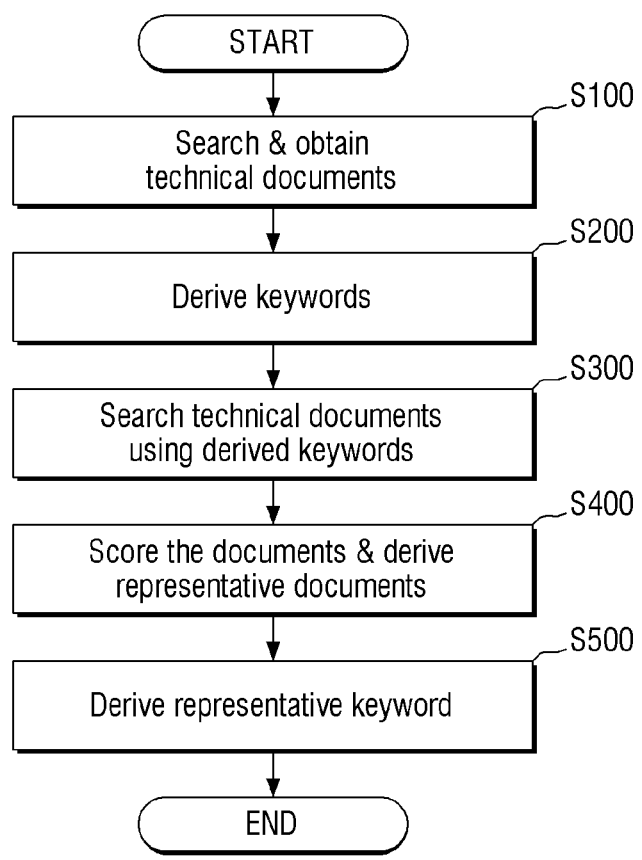
FIG. 2 is a flowchart showing a method for deriving keywords according to an embodiment of the present disclosure.

FIG. 2 is a flowchart showing a method for deriving keywords according to an embodiment of the present disclosure.

Referring to FIG. 2, in order to obtain representative keywords and representative documents, one or more technical document(s) of a desired technical field may be searched for and obtained (S100). In order to search for the technical document(s), a search field keyword for a search field related to the technical field, and a search year range of the technical document(s) to be searched for may be set and input. The search at S100 may be a search of numerous technical documents to identify a first subset of one or more relevant technical documents deemed relevant based on the search at S100.

Subsequently, derived keywords may be derived through the searched technical document(s) (S200) which were identified and obtained at S100. The specific method for deriving the derived keywords will be described below.

Next, the identified and obtained technical document(s) of the technical field may be re-searched, using the derived keywords (S300) which were derived at S200. The technical document(s) re-searched at S300 may be included in the technical document(s) searched for, identified and obtained at step S100.

Next, the re-searched technical document(s) may be scored to derive a second subset of one or more technical documents having a high score. Representative documents of the technical field in the second subset may be derived (identified) as one or more of the high-ranking technical documents having the high scores (S400). The specific contents thereof will be described below.

Subsequently, representative keywords of the technical field may be derived based on the representative document(s) in the second subset, using the method for deriving keywords similar to step S200 (S500). The specific contents thereof will be described below.

Figure 3:
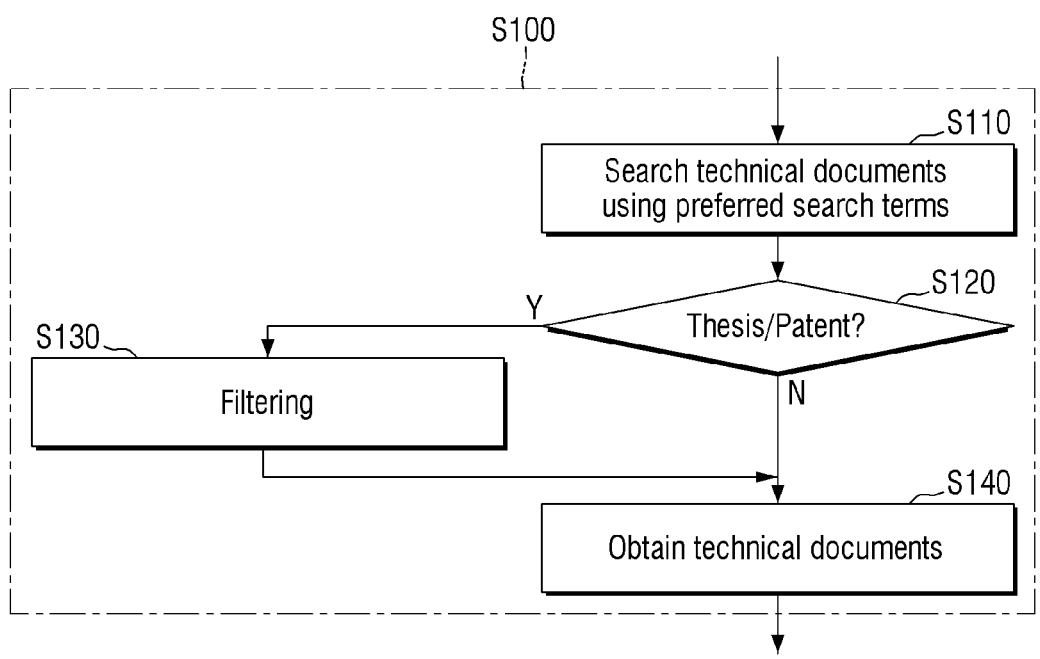
FIG. 3 is another flowchart for specifically explaining S100 in FIG. 2.

FIG. 3 is another flowchart for specifically explaining S100 in FIG. 2.

Referring to FIG. 3, in order to search for and obtain the technical document(s) in step S100 of FIG. 2, a step of searching through a number of the technical documents using desired search terms may be first performed (S110) to identify and obtain the first subset of technical document(s). Here, the desired search terms may include a keyword for the search field and a range of years of issue of each technical document sought in the search at S110.

Subsequently, the method shown by the flowchart in FIG. 3 includes determining whether the searched technical document is a thesis or a patent document (S120). When the technical document is not a thesis or a patent document (S120=N), the searched technical document may be obtained as it is and used as a technical document for deriving the keywords (S140).

On the other hand, when the searched technical document is a thesis or a patent document (S120=Y), filtering may be performed to improve reliability (S130). For example, filtering may be performed to use only theses issued by well-known journals and academic societies among the searched theses. Similarly, for example, filtering may be performed to utilize only the patent documents invented or filed by a specific company or institution among the searched patent documents. That is, when the searched technical document is a thesis or a patent document, filtering may be performed to utilize only the thesis or the patent document issued from a preset source. Therefore, searching a technical document and re-searching a technical document that is a thesis or patent document may be limited to only those theses and patent document specifying a preset source.

Specifically, an index for filtering theses may be input at step S110. The index may be or include, for example, a list of the top 20 journals and academic societies with the highest citation rates in the technical field provided by Google Scholar. However, the technical concept(s) of the present disclosure are not limited thereto, and the index may be made up of a list of journals and academic societies obtained through other methods.

Next, the filtered thesis or patent document may be obtained and utilized as a technical document for deriving the keywords (S140).

Figure 4:
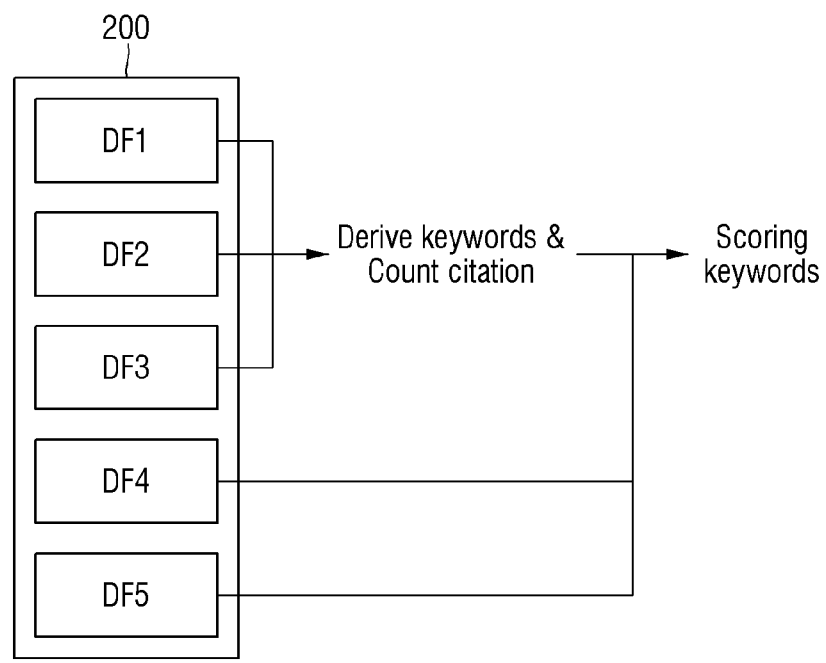
FIG. 4 is an exemplary diagram for explaining the technical document searched to derive the keywords.
Figure 5:
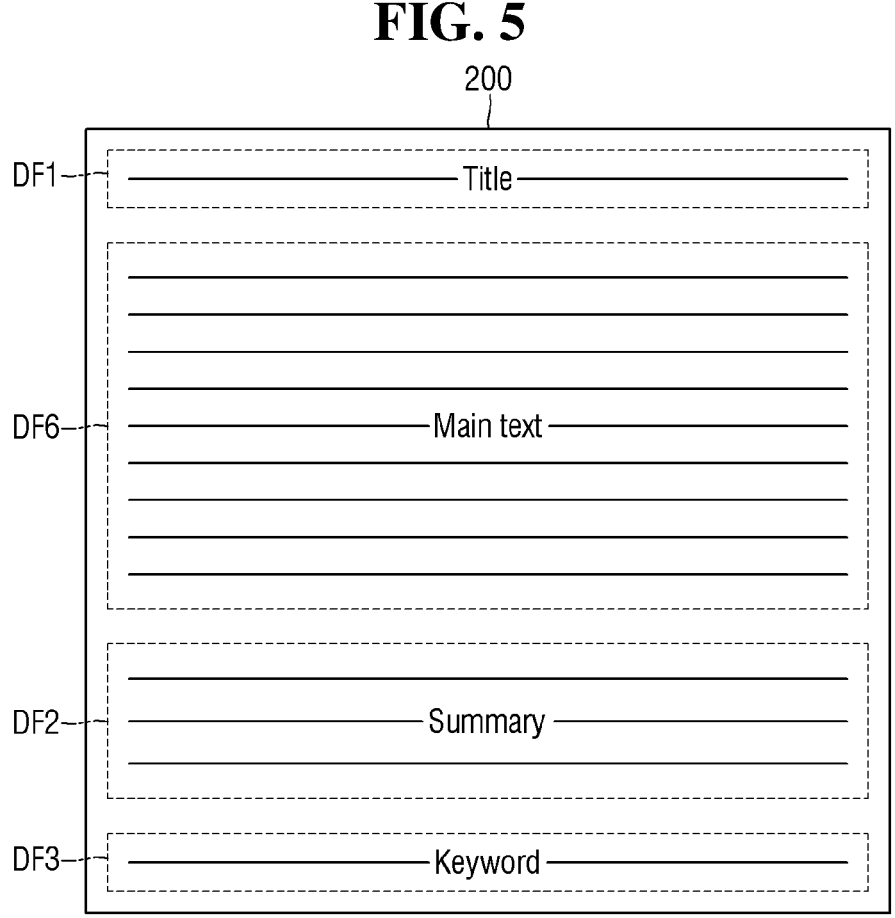
FIG. 5 is an exemplary diagram for explaining the technical document searched to derive the keywords.
Figure 6:
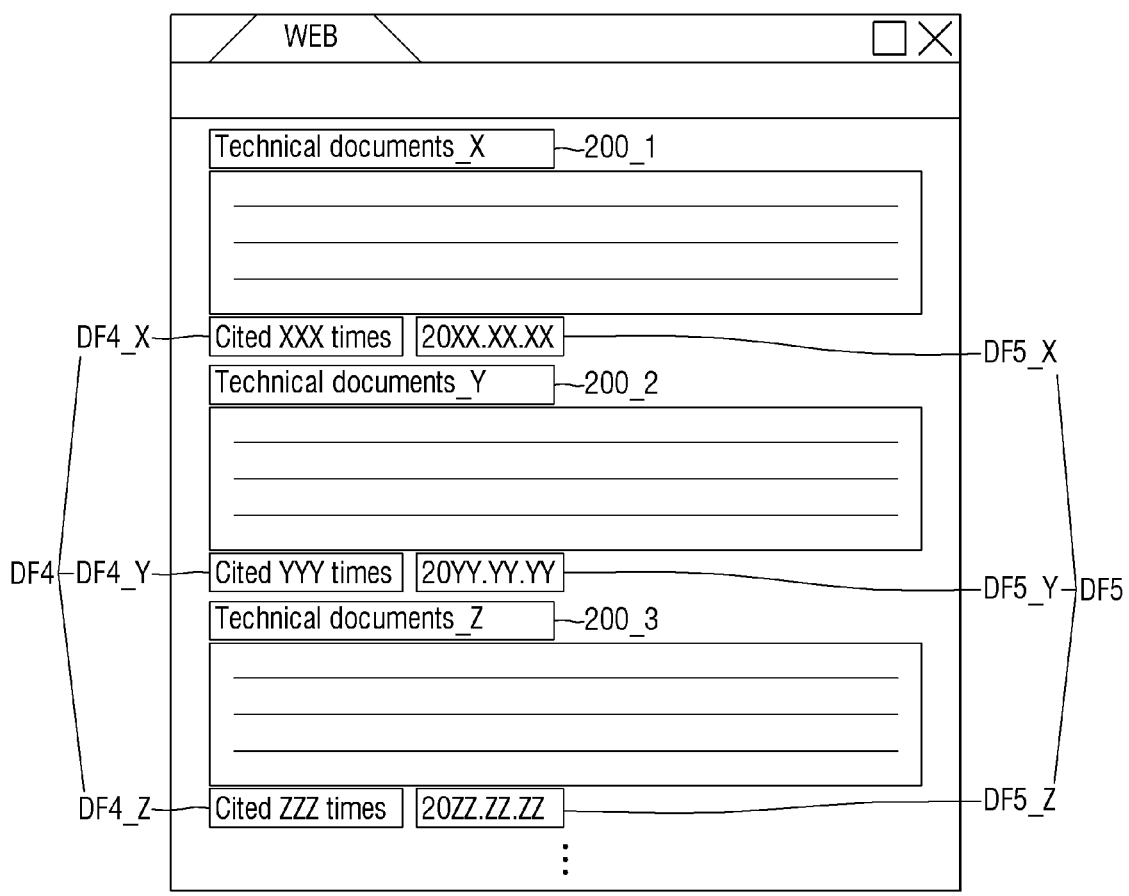
FIG. 6 is an exemplary diagram for explaining the technical document searched to derive the keywords.

FIG. 4, FIG. 5 and FIG. 6 are exemplary diagrams for explaining the technical document searched to derive the keywords.

First referring to FIG. 4, the technical document 200 may include a first data field DF1, a second data field DF2, a third data field DF3, a fourth data field DF4 and a fifth data field DF5 which are used to derive the representative keywords and the representative documents. The first data field DF1, the second data field DF2 and the third data field DF3 may be used to derive the keywords first. Subsequently, each keyword may be scored, using the keywords derived through the fourth data field DF4 and the fifth data field DF5 and first data field DF1, the second data field DF2 and the third data field DF3.

Referring to FIG. 4 and FIG. 5, a first data field DF1 may correspond to the title of the technical document 200, a second data field DF2 may correspond to the summary of the technical document 200, and a third data field DF3 may correspond to keywords which are input by an author of the technical document 200.

Since the title of the technical document 200 corresponding to the first data field DF1 may clearly describe the technique to be explained by the technical document 200 with limited keywords, it may be used to derive a representative keyword.

The summary of the technical document 200 corresponding to the second data field DF2 may easily summarize the contents of the main text and may be used to derive one or more representative keyword(s).

Similarly, since the keywords of the technical document 200 corresponding to the third data field DF3 are created to be easy for searching, and mainly include the keywords corresponding to the technical area including the technical document 200, the keywords may be used to derive the representative keywords.

On the other hand, the technical document 200 may include a sixth data field DF6 that is not used to derive the representative keywords and the representative documents. The sixth data field DF6 may correspond to the main text of the technical document 200.

In the case of the main text, general words in the technical field may be commonly used, and noise may occur in the process of extracting the keywords accordingly. Therefore, the sixth data field DF6 is not necessarily used in the process of deriving the keywords.

FIG. 6 is an exemplary diagram for explaining the technical document(s) searched to derive the keywords. Specifically, FIG. 6 is a diagram showing a result screen of searching the technical documents on the web.

Referring to FIG. 4 and FIG. 6, a plurality of technical documents may be searched when searching the technical documents. For example, as shown in FIG. 6, a first technical document 200_1, a second technical document 200_2, a third technical document 200_3, and the like may be searched.

On the other hand, the fourth data field DF4 may correspond to a number of citations of the technical document 200, and the fifth data field DF5 may correspond to the issue date or the publication date of the technical document 200.

For example, in FIG. 6, the fourth data field of the first technical document 200_1 corresponds to DF4_X, which may indicate that the first technical document 200_1 was cited XXX times through another technical document. Further, the fifth data field of the first technical document 200_1 corresponds to DF5_X, which means that the first technical document 200_1 was issued or published in 20XX.XX.XX.

Similarly, the fourth data field of the second technical document 200_2 corresponds to DF4_Y, which may indicate that the second technical document 200_2 was cited YYY times through other technical documents. Further, the fifth data field of the second technical document 200_2 corresponds to DF5_Y, which means that the second technical document 200_2 was issued or published in 20YY.YY.YY.

Similarly, the fourth data field of the third technical document 200_3 corresponds to DF4_Z, which may indicate that the third technical document 200_3 was cited ZZZ times through other technical documents. Further, the fifth data field of the third technical document 200_3 corresponds to DF5_Z, which means that the third technical document 200_3 was issued or published in 20ZZ.ZZ.ZZ.

Figure 7:
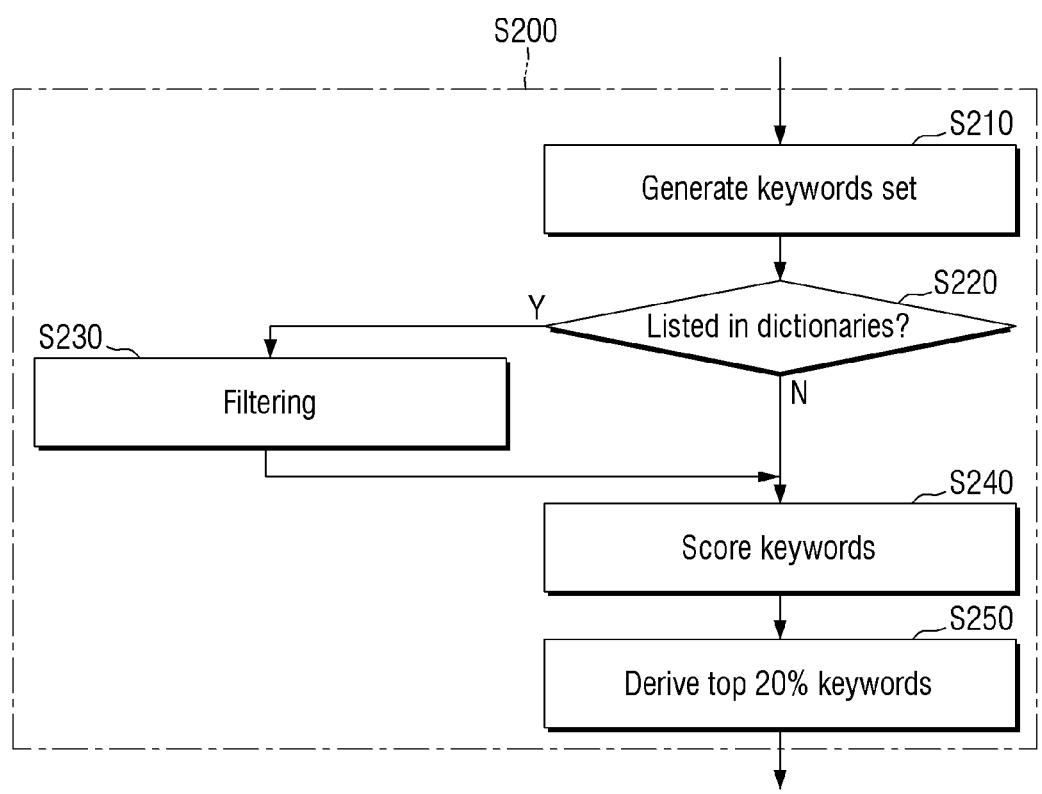
FIG. 7 is another flowchart for specifically explaining S200 in FIG. 2.
Figure 8:
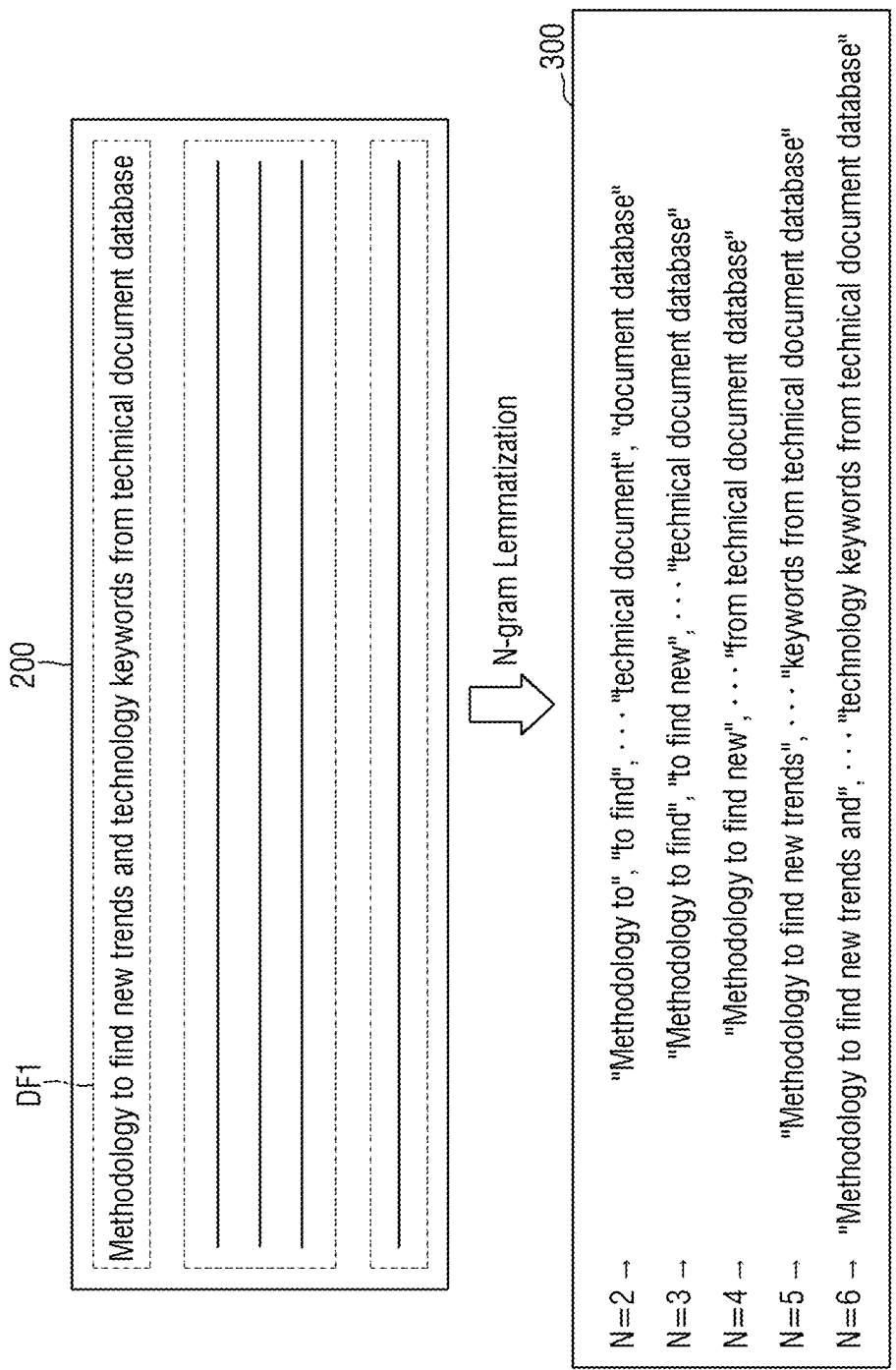
FIG. 8 is another exemplary diagram for specifically explaining the process of generating a keyword set at S210 in FIG. 7.
Figure 9:
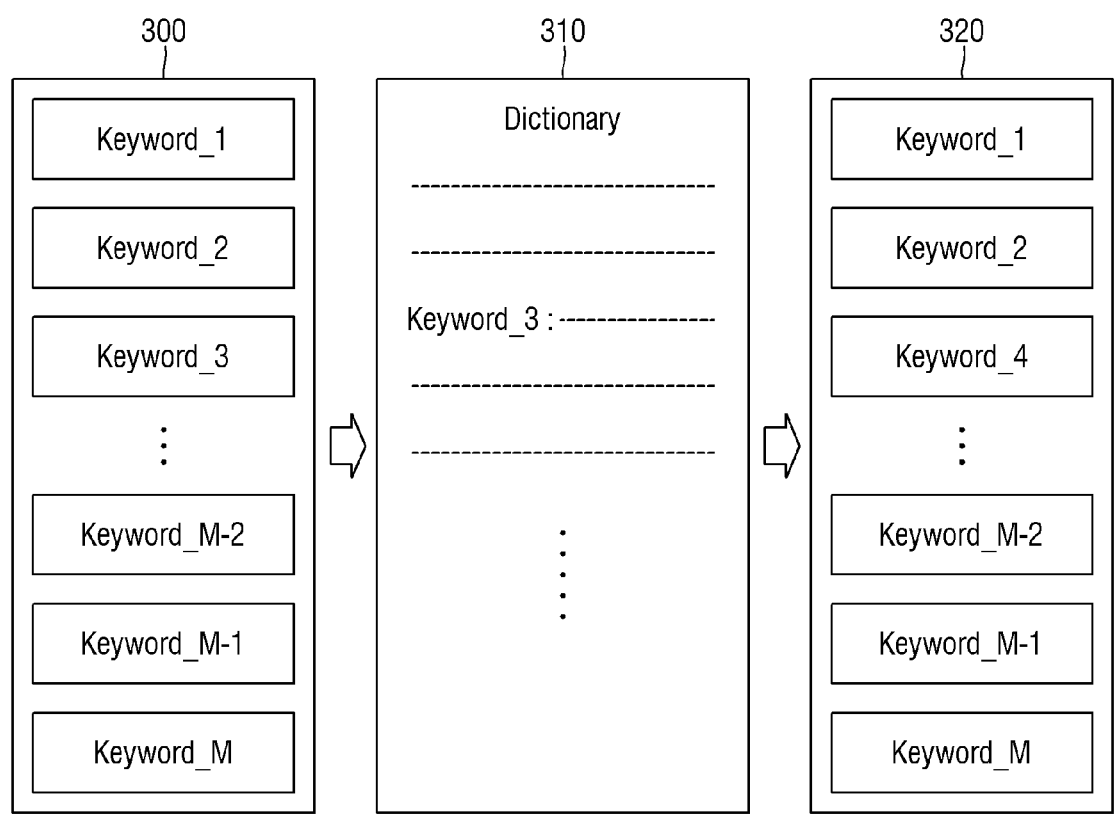
FIG. 9 is another exemplary diagram for specifically explaining the keywords to be excluded among the keywords included in the keyword set at S230 in FIG. 7.

FIG. 7 is another flowchart for specifically explaining S200 in FIG. 2, FIG. 8 is another exemplary diagram for specifically explaining the process of generating a keyword set at S210 in FIG. 7. FIG. 9 is another exemplary diagram for specifically explaining the keywords to be excluded among the keywords included in the keyword set at S230 in FIG. 7.

Referring to FIG. 7, a keyword set may be first generated to derive the keywords of step S200 (S210). Specifically, the keyword set may be generated, using the first data field DF1, the second data field DF2 and the third data field included in the technical documents described with respect to FIG. 4 and FIG. 5.

Specifically, referring to FIG. 8, assuming the technical document 200 is any one of the plurality of searched technical documents and the first data field DF1 of the technical document 200 is the title of the technical document 200, that is, the title of "Methodology to find new trends and technology keywords from technical document database", N-gram lemming may be performed on the title. Here, the N-gram lemmatization may refer to a process of generating a set of word groups consisting of N predetermined adjacent words in an arbitrary sentence, wherein N is a natural number. At this time, the set of generated word groups may be or include the keyword set 300.

For example, in the case of N=2 in the title, word groups such as "Methodology to", "to find", and "find new" may be generated in order, and the word group of "document database" may be finally generated. By applying this method in order up to N=6, it is possible to generate a database of technical keywords from one or more technical document(s).

On the other hand, if any word is indicated by an abbreviation in the above step, the above step for generating the keyword set 300 may be performed after replacing the abbreviation with an original form.

For example, in the first data field DF1, the second data field DF2 and the third data field DF3 of the technical document 200, when "Neural Process Unit" (i.e., a neural network processing device) is described by an abbreviation such as "NPU", the abbreviation may be replaced with the original form of "Neural Process Unit", and the generation process of the keyword set 300 may be performed.

On the other hand, in the case of N=1 at the step of performing the N-gram lemmatization, the word group may be eventually made up of a single word. Therefore, since that keyword has a high degree of abstraction of the technique and is hard to express via any specific technique, the keyword may be excluded from the generating work of the keyword set 300.

Further, in the case of N=7, the keywords may be made up of 7 or more words. However, since the keywords consisting of 7 or more words generally do not exist, this may also be excluded from the generation step of the keyword set 300.

However, the range of N is not limited to the aforementioned embodiments, and the range of N values of may be changed indefinitely to derive accurate representative keywords and representative documents.

On the other hand, for convenience of explanation, although the first data field DF1 of the technical document 200 has been described as an example in the above description, one of ordinary skill in the relevant art will recognize that the above-mentioned method for generating the keywords may be performed not only on the first data field DF1 but also on the second data field DF2.

However, in the case of the third data field DF3, since keyword(s) have already been classified by the author of the technical document 200, the above-mentioned keyword generation step does not proceed and the keywords may be used as described. However, even in this case, if any word included in the third data field DF3 is indicated by an abbreviation, the step of replacing the abbreviation with the original form may be performed.

Subsequently, the method shown by the flowchart in FIG. 7 includes determining whether a plurality of keywords included in the generated keyword set are specified in a dictionary (S220). Specifically, the method shown by the flowchart in FIG. 7 includes determining whether a plurality of keywords included in the keyword set are specified in a preset technical dictionary.

Specifically, referring to FIG. 9, the keyword set 300 generated at step S210 may include M keywords (Keyword_1, Keyword_2, . . . , Keyword_M-1, and Keyword_M).

At this time, for example, when the third keyword (Keyword 3) is specified in the dictionary 310, the keyword may be excluded from the keyword set because the keyword is already well-known and commercialized. As described above, the final keyword set 320 may be generated after the keyword set 300 is filtered by the dictionary 310.

On the other hand, the dictionary 310 may be a technical dictionary. The dictionary 310 may include an IEEE synonym dictionary (Institute of Electrical and Electronics Engineers Thesaurus), taxonomy, Wikipedia, and the like.

Next, the keywords included in the generated final keyword set are scored (S240). The first data field, the second data field, the third data field, the fourth data field and the fifth data field of the searched technical documents may be used to score the keywords.

Specifically, the method shown by the flowchart in FIG. 7 may include counting how many times each keyword included in the keyword set is mentioned in each of the searched technical documents. After that, the score of the keyword for the technical document is calculated using the fourth data field and the fifth data field of each technical document and the count number, and the above process is performed for all the searched technical documents to score the keywords. In other words, scoring of the keywords may be performed for the entirety of a searched technical document or for all searched technical documents through the following formula:

$$\text{Keyword}_{score} = \Sigma(\text{Keyword}_{count} \times W_{month} \times W_{citation})(\text{for all searched documents}) \quad \text{[Formula 1]}$$

Here, $\text{Keyword}_{count}$ may indicate the number of times the keywords in each of the searched technical documents are mentioned, $W_{month}$ may indicate a weight that reflects the issue date or publication date of the technical document, and $W_{citation}$ may indicate a weight that reflects a number of citations and issue date or publication date of the technical document.

Here, $W_{month}$, may be calculated through the following formula.

$$W_{month} = \frac{\text{Month}_{whole} - \text{Month}_{pub}}{\text{Month}_{whole}} \text{ (for each document)} \quad \text{[Formula 2]}$$

Here, $\text{Month}_{whole}$ may indicate a period in which the search year range of the technical document is converted into months, and $\text{Month}_{pub}$ may indicate a numerical value in which the period from the present time to the issue date or publication date of the technical document and may be expressed as months.

For example, if the search year range is 3 years and the technical document is published 6 months ago, the $\text{Month}_{whole}$ may have a value of 36, and the $\text{Month}_{pub}$ of that technical document may have a value of 6.

However, embodiments are not limited thereto, and one of ordinary skill in the relevant art will recognize that $W_{month}$ may be calculated through other formulas that allow higher weights to be given in recently issued or published literature.

On the other hand, the value of $W_{citation}$ may have weights so that the more recent the document is issued or published, the higher the score.

For example, assuming a weight of 1.2 is given in the case of a technical document issued in 2021, and a weight of 1.15a is given in the case of a document issued in 2020, if any technical document was published in 2021 and cited 100 times by other technical documents, the value of $W_{citation}$ may be 120. On the other hand, if any technical document was published in 2020 and cited 100 times by other technical documents, the value of $W_{citation}$ may be 115.

However, embodiments are not limited thereto, and one of ordinary skill in the relevant art will recognize that the value of $W_{citation}$ may have other values that allow higher weights to be given in recently issued or published literature.

Next, referring to FIG. 7, after scoring each of the plurality of keywords included in the keyword set, only the top 20% of the keywords may be output in accordance with Pareto's law (S250).

Specifically, the Pareto's law may indicate that the top 20% of the derived keywords may represent that technical field. Therefore, by applying the Pareto's law, it is possible to derive only the top 20% of the keywords having a high score among the plurality of keywords included in the keyword set. That is, Pareto's law may be applied to identify a top percentage of keywords, such as the 20% of the keywords having the highest score.

Figure 10:
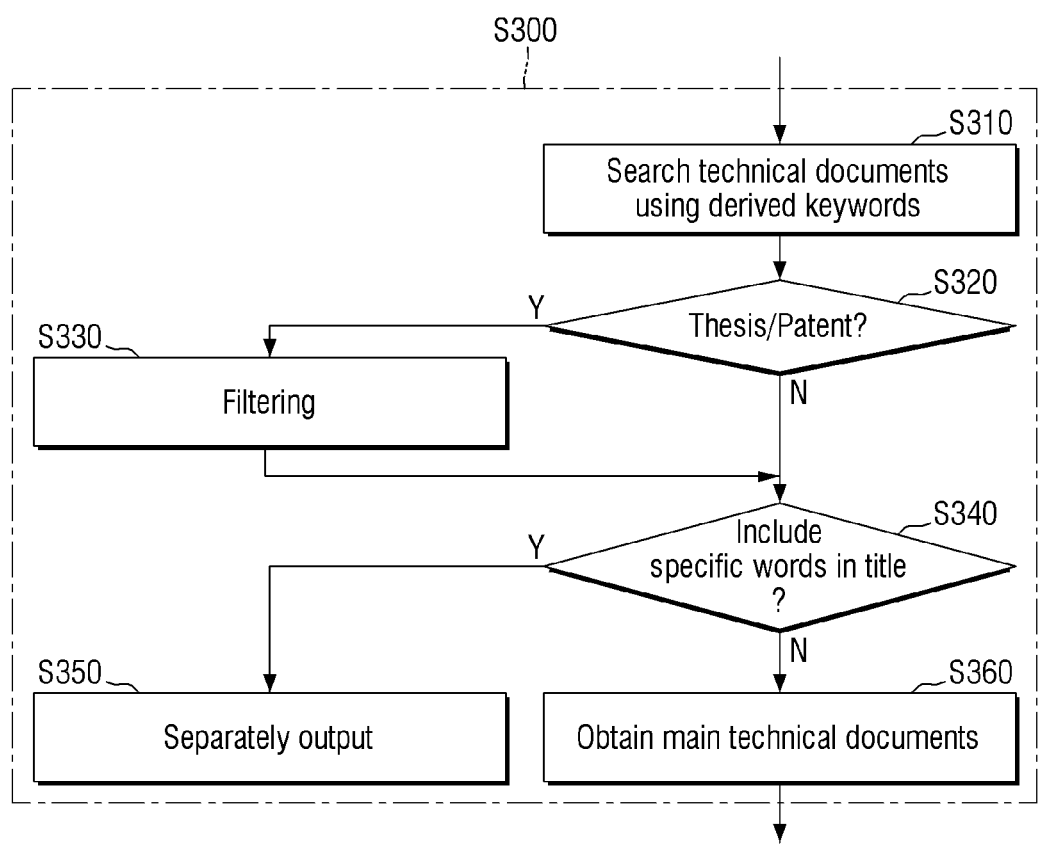
FIG. 10 is another flowchart for specifically explaining S300 in FIG. 2.
Figure 11:
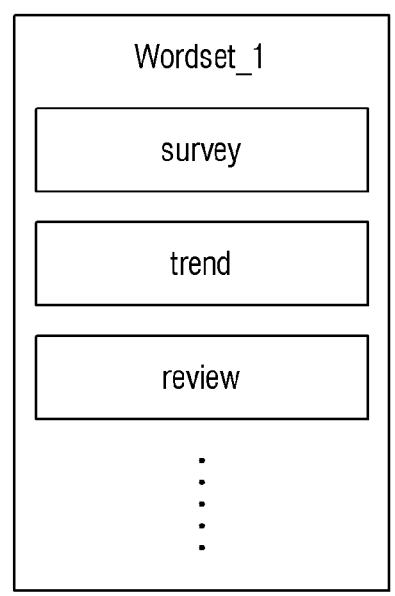
FIG. 11 is another exemplary diagram for explaining technical documents to be output separately among the searched technical documents at S340 in FIG. 10.

FIG. 10 is another flowchart for specifically explaining S300 in FIG. 2. FIG. 11 is another exemplary diagram for explaining technical documents to be output separately among the searched technical documents at S340 in FIG. 10.

Referring to FIG. 10, in order to re-search the technical document in step S300 of FIG. 2, the technical document may be re-searched in the technical field again, using the top 20% of keywords derived at step S200 (S310).

Next, the method shown by the flowchart in FIG. 10 includes determining whether the re-searched technical document is a thesis or a patent document as described with respect to FIG. 3 (S320). Accordingly, at S330, filtering may be performed in the same manner as shown with respect to S130 in FIG. 3.

On the other hand, the method shown by the flowchart in FIG. 10 includes determining whether a specific word is included in the first data field of the re-searched technical document, that is, the title (S340).

Specifically, referring to FIG. 11, a first word set (Wordset_1) including a plurality of words may be set in advance. The first word set (Wordset_1) may include words such as "survey", "trend", and "review".

In the case of a technical document in which the above words are included in the title, it may be a technical document in which trends and advantages or disadvantages of elemental technologies of a specific field are compared. As a result, when the technical document has a title including one or more words in the first word set (Wordset_1), the technical document may be stored separately from the other technical documents re-searched for use when creating the outline of the technology, or may be output separately (S350). Accordingly, one or more words in a title of a technical document may result in the technical document being separated from the main body of technical documents which are being processed to identify a representative document.

On the other hand, although FIG. 11 shows that the first word set (Wordset_1) includes only the words of "survey", "trend", and "review", one of ordinary skill in the relevant art will recognize that the present disclosure is not limited thereto. That is, in order to explain the elemental technology of that field, words generally used in the title of the technical document may be further included in the first word set (Wordset_1).

Referring to FIG. 10 again, the main technical document(s) to be scored may be obtained to derive the representative document. The main technical document(s) may be the technical documents originally searched at S310, except for any technical document(s) which are separately stored or output at step S350 (S360) based on the presence in the title of a word among the first word set (Wordset_1).

Figure 12:
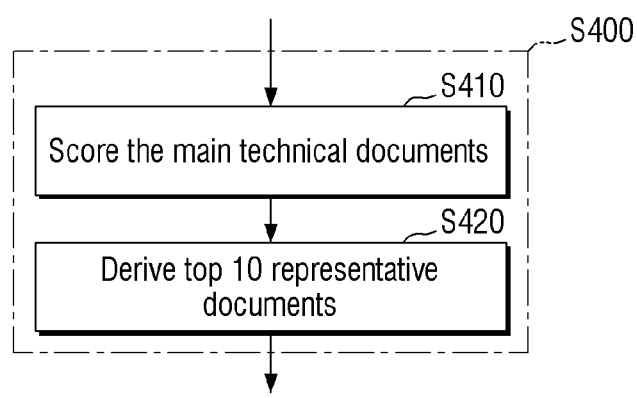
FIG. 12 is another flowchart for specifically explaining S400 in FIG. 2.

FIG. 12 is a flowchart for specifically explaining S400 in FIG. 2.

Referring to FIG. 12, in order to score the technical document(s) in step S400 in FIG. 2 and derive representative documents, first, the main technical document(s) obtained at step S300 may be scored (S410). The method of scoring the main technical document(s) at S410 in FIG. 12 may be the same as the method described at step S240 in FIG. 7.

Subsequently, at S420 a number of top documents among the main technical document(s) may be extracted and derived as representative documents of a technical field. The number of top documents to be extracted and derived may be a predetermined number. For example, the top 10 documents among the main technical document(s) may be extracted and derived as representative documents of that technical field (S420).

Figure 13:
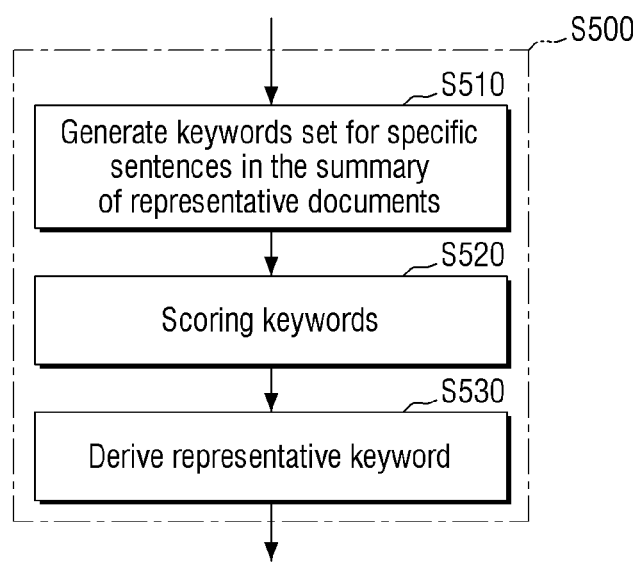
FIG. 13 is another flowchart for specifically explaining S500 in FIG. 2.
Figure 14:
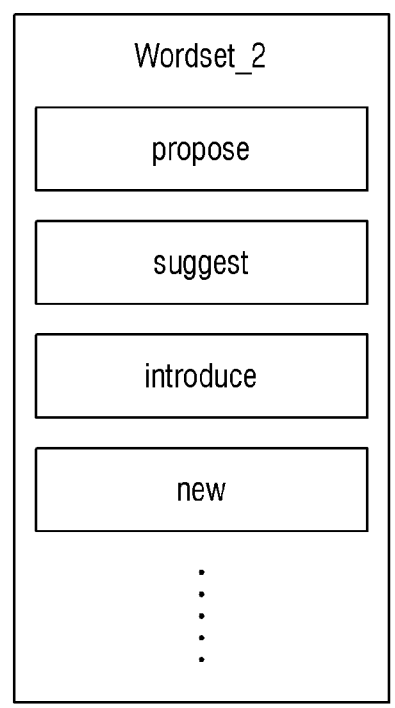
FIG. 14 is another exemplary diagram for specifically explaining a method of deriving representative keywords at S510 in FIG. 13.

FIG. 13 is another flowchart for specifically explaining S500 in FIG. 2. FIG. 14 is an exemplary diagram for specifically explaining a method of deriving representative keywords at S510 in FIG. 13.

Referring to FIG. 13, in order to derive the representative keyword of the technical field in step S500 of FIG. 2, the keyword set may be generated, using the second data field of the representative document derived at step S420, that is, the summary part (S510).

Specifically, referring to FIG. 14, a second word set (Wordset_2) including a plurality of words may be set in advance. The second word set (Wordset_2) may include words such as "propose", "suggest", "introduce", and "new".

Words such as those mentioned above may have the meaning of suggesting trends for elemental technologies of a specific field or presenting technologies that will be prominent in the future. Therefore, in the summary part of the derived representative document, the keyword set may be generated, using the sentence including the words included in the second word set (Wordset_2).

Specifically, an algorithm for scoring may be applied to a plurality of sentences included in the summary part of the representative document. The algorithm may be programmed to give a higher score to a sentence including many words included in the second word set (Wordset_2). The algorithm may score a plurality of sentences based on the number of words from the Wordset_2 in each sentence. Although a Jaccard similarity expression may be used as an example of the algorithm, the embodiment is not limited thereto. One of ordinary skill in the relevant art will recognize that the algorithm may be implemented in another way than by giving a higher score for sentences including more words in the second word set (Wordset_2).

The sentence with the highest score may be derived through the above process. A keyword set may be generated for the derived sentence. The method of generating the keyword set at S510 in FIG. 13 may be the same as the method described at step S210 in FIG. 7.

Next, a plurality of keywords included in the keyword set are scored, using the generated keyword set (S520). The method of scoring a plurality of keywords at S520 in FIG. 13 may be the same as the method described at step S240 in FIG. 7.

Next, the keyword which obtains the highest score may be derived as representative keyword for the relevant technical field (S530).

Figure 15:
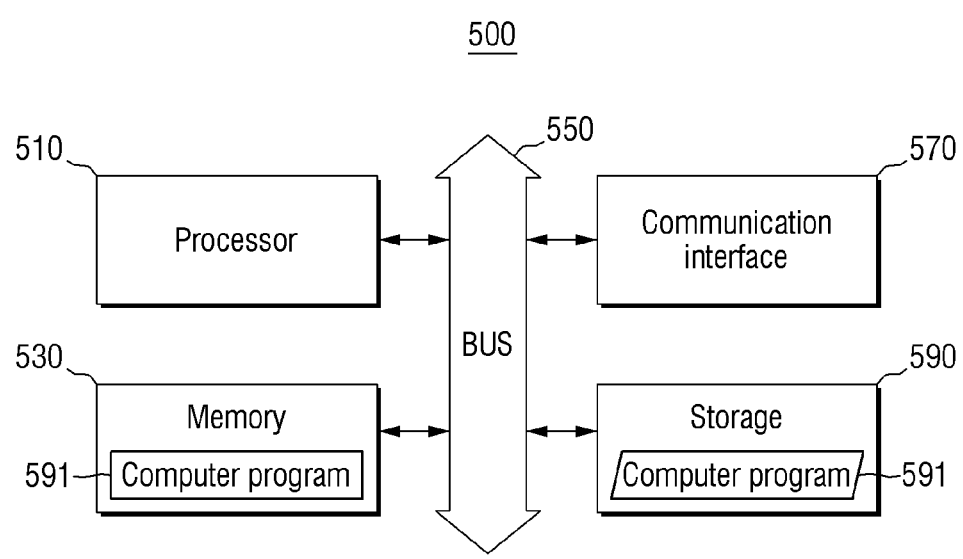
FIG. 15 is a block diagram schematically showing the hardware of the apparatus for deriving keywords through the technical document database according to another embodiment.

FIG. 15 is a block diagram schematically showing the hardware of the apparatus for deriving keywords through the technical document database according to another embodiment.

Referring to FIG. 15, a computing device 500 may include one or more processors 510, a bus 550, a communication interface 570, a memory 530 which loads a computer program 591 to be executed by the processor 510, and a storage 590 which stores the computer program 591. The storage 590 is a storage device such as a tangible non-transitory computer readable medium that stores the computer program 591.

However, FIG. 15 shows only the components related to the embodiments of the present disclosure. Therefore, one of ordinary skill in the relevant technical field(s) to which the present disclosure pertains may understand that other general-purpose components may be further included in addition to the components shown in FIG. 15.

The processor 510 may control the overall operation of each configuration of the computing device 500. The processor 510 may directly perform some operations such as logical operations, and indirectly control other operations such as by sending instructions to other elements of the computing device 500. The processor 510 may be configured to include at least one of a CPU (Central Processing Unit), an MPU (Micro processor Unit), an MCU (Micro Controller Unit), a GPU (Graphic Processing Unit), or any type of processor well known in the technical field of the present disclosure. In addition, the processor 510 may perform computation on at least one application or program for performing methods/operations according to various embodiments of the disclosure. The computing device 500 may include one or more processors.

Memory 530 may store various data, instructions, and/or information. The memory 530 may load one or more instances of the computer program 591 from storage 590 to perform methods/operations according to various embodiments of the disclosure. For example, when the computer program 591 is loaded into the memory 530, it may be implemented on the memory 530. An example of memory 530 may be, but is not limited to, a RAM.

The bus 550 may provide a communication function between the components of the computing device 500. The bus 550 may be implemented as various types of buses such as an address bus, a data bus, and a control bus.

The communication interface 570 may support wired or wireless internet communication of the computing device 500. The communication interface 570 may support various communication systems other than Internet communication. For this purpose, the communication interface 570 may be configured to include a communication module that is well known in the technical field of the present disclosure.

The storage 590 may non-temporarily store one or more instances of the computer program 591. The storage 590 may be configured to include a non-volatile memory such as a ROM (Read Only Memory), an EPROM (Erasable Programmable ROM), an EEPROM (Electrically Erasable Programmable ROM) and flash memory, a hard disk, a removable disk, or any known form of computer-readable recording medium well known in the technical field to which the present disclosure pertains.

The computer program 591 may include one or more instructions in which the methods/operations according to the various embodiments of the present disclosure are implemented. When the computer program 591 is loaded into the memory 530, the processor 510 may directly and/or indirectly perform the methods/operations according to various embodiments of the disclosure by executing one or more instructions.

The computer program 591 may be stored in a recording medium such as a DVD-ROM or a flash memory device.

In concluding the detailed description, those skilled in the art will appreciate that many variations and modifications may be made to the preferred embodiments without substantially departing from the principles of the present disclosure. Therefore, the disclosed preferred embodiments of the disclosure are used in a generic and descriptive sense only and not for purposes of limitation.

What is claimed is:

1. A method comprising:
   searching, by a processor executing a computer program, a technical document including a first data field, a second data field, and a third data field based on search terms and search year ranges related to a technical field;
   generating a keyword set using the first data field, the second data field and the third data field of the searched technical document, wherein the first data field includes a title of the technical document, the second data field includes a summary of the technical document, and the third data field includes a plurality of keywords of the technical document, and wherein generating the keyword set comprises scoring the plurality of keywords included in the keyword set and selecting, based on the scoring, a subset the plurality of keywords as the keyword set;
   re-searching, by the processor executing the computer program, the technical document related to the technical field, using the keyword set;
   scoring the re-searched technical document to derive a representative document representing the technical field; and
   deriving a representative keyword representing the technical field, using the second data field included in the representative document.

2. The method of claim 1, wherein generating the keyword set includes
   generating a set of word groups consisting of N predetermined adjacent words for sentences described in the first data field and the second data field.

3. The method of claim 2, wherein N is a natural number of 2 or more and 6 or less.

4. The method of claim 1, wherein the technical document further includes a fourth data field and a fifth data field,
   the fourth data field includes a number of citations of the technical document,
   the fifth data field includes an issue date or publication date of the technical document, and
   wherein scoring the plurality of keywords included in the keyword set is based on the fourth data field and the fifth data field.

5. The method of claim 4, wherein scoring the plurality of keywords included in the keyword set includes
   adding a value, which is obtained by multiplying a number of times each keyword of the plurality of keywords in the searched technical document are mentioned, a weight reflecting the number of times the technical document is cited, and a weight reflecting the issue date or publication date of the technical document, for an entirety of the searched technical document.

6. The method of claim 1, wherein selecting some of the plurality of keywords includes scoring the plurality of keywords and selecting a top 20% of keywords.

7. The method of claim 1, further comprising:
excluding a keyword specified in a preset technical dictionary among a plurality of keywords included in the generated keyword set from the keyword set.

8. The method of claim 1, wherein searching the technical document includes searching only a thesis or patent document published by a preset source specified in the searched technical document.

9. The method of claim 8, wherein re-searching the technical document includes re-searching only a thesis or patent document published by a preset source specified in the searched technical document.

10. The method of claim 1, further comprising:
when a word included in a preset first word set is included in the first data field, among the re-searched technical document using the keyword set, outputting the word separately.

11. The method of claim 1, wherein a first algorithm used in scoring the plurality of keywords is the same as a second algorithm used in scoring the re-searched technical document.

12. The method of claim 1, wherein deriving the representative keyword includes
generating a set of word groups consisting of N predetermined adjacent words for a sentence described in the second data field included in the representative document.

13. The method of claim 12, wherein the sentence described in the second data field includes words included in a preset second word set.

14. The method of claim 12, further comprising:
scoring the plurality of keywords included in the set of word groups and deriving the keyword having a highest score as the representative keyword.

15. An apparatus, the apparatus comprising:
a processor;
a storage device configured to store a computer program; and
a memory which is configured to load instructions related to the computer program to be executed by the processor,
wherein, when executed, the computer program causes the processor to:
search a technical document including a first data field, a second data field and a third data field based on search terms and search year ranges related to a technical field,
generate a keyword set using the first data field, the second data field and the third data field of the searched technical document, wherein the first data field includes a title of the technical document, the second data field includes a summary of the technical document, and the third data field includes a plurality of keywords of the technical document, and wherein generating the keyword set comprises scoring the plurality of keywords included in the keyword set, and select, based on the scoring, a subset of the plurality of keywords as the keyword set,
re-search the technical document related to the technical field, using the keyword set,
score the re-searched technical document to derive a representative document representing the technical field, and
derive a representative keyword representing the technical field, using the second data field included in the representative documents.

16. The apparatus of claim 15, wherein generation of the keyword set includes
generating a set of word groups consisting of N predetermined adjacent words for sentences described in the first data field and the second data field.

17. The apparatus of claim 15, wherein the technical document further includes a fourth data field and a fifth data field,
the fourth data field includes a number of citations of the technical document,
the fifth data field includes an issue date or publication date of the technical document, and
wherein scoring of the plurality of keywords included in the keyword set is based on the fourth data field and the fifth data field.

18. A tangible non-transitory computer readable medium that stores a computer program, wherein the computer program, when executed by a processor of a computing device, causes the computing device to perform a process including:
searching a technical document including a first data field, a second data field and a third data field based on search terms and search year ranges related to a technical field;
generating a keyword set using the first data field, the second data field and the third data field of the searched technical document, wherein the first data field includes a title of the technical document, the second data field includes a summary of the technical document, and the third data field includes a plurality of keywords of the technical document, and wherein generating the keyword set comprises scoring the plurality of keywords included in the keyword set, and selecting, based on the scoring, a subset the plurality of keywords as the keyword set;
re-searching the technical document related to the technical field, using the keyword set;
scoring the re-searched technical document to derive representative documents representing the technical field; and
deriving a representative keyword representing the technical field, using the second data field included in the representative document.

19. The tangible non-transitory computer readable medium of claim 18, wherein generating the keyword set includes
generating a set of word groups consisting of N predetermined adjacent words for sentences described in the first data field and the second data field.

20. The tangible non-transitory computer readable medium of claim 18, wherein the technical document further includes a fourth data field and a fifth data field,
the fourth data field includes a number of citations of the technical document,
the fifth data field includes an issue date or publication date of the technical document, and
scoring the plurality of keywords included in the keyword set is based on the fourth data field and the fifth data field.

* * * * *